United States Patent
Nozaki et al.

(10) Patent No.: US 6,744,475 B2
(45) Date of Patent: Jun. 1, 2004

(54) VIDEO SWITCHING APPARATUS FOR SWITCHING BETWEEN A PLURALITY OF CHANNELS

(75) Inventors: Kazuo Nozaki, Yokohama (JP); Tsuneaki Ishimura, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 481 days.

(21) Appl. No.: 09/903,454

(22) Filed: Jul. 11, 2001

(65) Prior Publication Data

US 2002/0005901 A1 Jan. 17, 2002

(30) Foreign Application Priority Data

Jul. 13, 2000 (JP) .................................. P2000-213169

(51) Int. Cl.[7] ............................................. H04N 5/268
(52) U.S. Cl. ....................................... 348/705; 386/108
(58) Field of Search ................................. 348/153, 159, 348/705, 706, 385.1, 387.1, 388.1; 386/52, 61, 66, 95, 108

(56) References Cited

U.S. PATENT DOCUMENTS 5,671,009 A * 9/1997 Chun ........................ 348/153
5,875,007 A * 2/1999 Zhung et al. ............. 375/240.28
6,243,530 B1 * 6/2001 Kato ............................ 386/94
6,317,160 B1 * 11/2001 Yoshida et al. ............. 348/473

FOREIGN PATENT DOCUMENTS

JP          11-341482          12/1999

* cited by examiner

Primary Examiner—Victor R. Kostak
(74) Attorney, Agent, or Firm—Pearne & Gordon LLP

(57) ABSTRACT

To generate a multiple video signal generated by video recorder 2, a conforming or nonconforming ID signal superimposed on a video signal is detected by an ID detecting circuit 11. Operation of appending a conforming ID signal is switched by a selector 14 based on the output of a state determination circuit 12. A conforming ID signal ID-β generated by an ID generation circuit 13 is selected by the selector 14 in a mode for generating a video signal where a nonconforming ID signal is superimposed and only in case an ID signal is detected by the ID detecting circuit 11. The ID signal ID-β is used to perform switchover of a nonconforming multiple video signal via a play/recording control circuit 17 and output a video signal on a predetermined channel where the same ID signal is superimposed.

6 Claims, 4 Drawing Sheets

VIDEO SWITCHING APPARATUS FOR SWITCHING BETWEEN A PLURALITY OF CHANNELS

BACKGROUND OF THE INVENTION

1. Field of the Invention

The present invention relates to video switching apparatus for switching between a plurality of video signal inputs and outputting the selected video signal input to video recording apparatus or a monitor, and in particular to video switching apparatus for processing the video signal input of a plurality of channels multiplexed in time units such as frames and fields.

2. Description of the Related Art

Video switching apparatus called a frame switcher or a multiplexer has been in use for inputting a plurality of video signals such as video outputs from a plurality of video cameras and dividing per channel the signal in time units such as frames and fields to multiplex the signals and outputting the signals to video recording apparatus such as a VTR, or inputting a multiple video signal generated by video recording apparatus and outputting the signal per channel onto a monitor. Such video switching apparatus generally appends an ID signal for identification to the video signal on each channel for multiplexing and records these video signals as a single video signal on video recording apparatus. To generate a multiplexed video signal, the ID signal superimposed on a video signal is read, the target video signal is selected based on the ID information and the video signals on the established channels are extracted so that only the video signals where the same ID signal is superimposed are output to a monitor. By appending an ID signal, it is possible to select and output a video signal on a predetermined channel.

Specifications of such an ID signal are uniquely defined per manufacturer and type of apparatus. While a multiple video signal on which an ID signal conforming to the apparatus in use is superimposed can be selected and generated, a multiple video signal on which an ID signal of an unsupported system is superimposed does not allow generation of the signal on a predetermined channel or video switchover since corresponding ID information cannot be recognized.

In order to solve such a problem, apparatus has been proposed for appending an ID signal conforming to the same system as the apparatus in use in generating a multiple video signal recorded with an ID signal of a different system is superimposed in order to allow generation control such as signal switchover via the appended ID signal. A configuration example of video switching apparatus for appending a ID signal conforming to the apparatus in use in generating a multiple video signal conforming to a different system.

Video switching apparatus 51 is composed of an ID detecting circuit 52, an ID information read circuit 53, a play/recording control circuit 54, a selector for selecting video signals 55, an ID generation circuit 56, and a selector for selecting ID signals 57. To a generation input terminal 58 is connected the output terminal of video recording apparatus 62. To a recording output terminal 59 is connected the input terminal of the video recording apparatus 62. To a monitor output terminal 60 is connected a monitor 61.

The video switching apparatus 51 in this example is configured so that the generation mode may be set in advance on the menu setup section (not shown) by the user to input a setup mode signal. The case where a multiple video signal on which an ID signal conforming to the same system as the apparatus in use is superimposed is generated is called Mode A, while the case where a multiple video signal on which an ID signal of a different system is superimposed is generated is called Mode B.

For Mode A, the input of the selector 57 is connected to the generation input terminal 58. A video signal input from the generation input terminal 58 is input to the ID detecting circuit 52 and the ID information read circuit 53 via the selector 57. The ID detecting circuit 52 detects presence/absence of an ID signal in a video signal and outputs a switching control signal to the selector 55 depending on the detection result. In case the ID signal is detected (the ID signal is superimposed), the selector 55 outputs an output video signal S2 of the play/recording control circuit 54 to the monitor output terminal 60. In case the ID signal is not detected (the ID signal is not superimposed), the selector 55 outputs a video signal S1 input from the generation input terminal 58 to the monitor output terminal 60. The output video signal S2 of the play/recording control circuit 54 is also output to the recording output terminal 59.

The ID information read circuit 53 reads the information in the ID signal and outputs the ID information to the play/recording control circuit 54. The play/recording control circuit 54 processes the video signal based on the input ID information. For example, the play/recording control circuit 54 extracts and outputs only a video signal where the predetermined same ID information specified by the user is superimposed from a multiple video signal divided on channels per frame or field. In case no ID information is input, the play/recording control circuit 54 outputs a black image video signal.

For Mode B, the input of the selector 57 is connected to the ID generation circuit 56. A conforming ID signal generated in the ID generation circuit 56 is input to the ID detecting circuit 52 and the ID information read circuit 53 via the selector 57. The ID detecting circuit 52 detects the ID signal generated in the ID generation circuit 56 and outputs a switching control signal to the play/recording control circuit 54. The play/recording control circuit 54 outputs a video signal on a channel corresponding to the ID information from the multiple video signal. The video signal S2 is output to the monitor output terminal 60 via the selector 55. In this way, by generating and appending an ID system conforming to the system of the apparatus in use in generating a multiple video signal where an ID signal conforming to a different ID signal is superimposed, it is possible to control switchover of multiplexed video signals on channels.

The video switching apparatus 51 configured as mentioned earlier always appends a conforming ID signal to the input video signal S1 for generation in Mode B, so that the ID information in the appended ID signal is input to the play/recording control circuit 54 even when the video recording apparatus 62 has stopped generation. Thus, the channel corresponding to the ID information in the video signal S1 input from the generation input terminal 58 is output as a video signal S21 from the play/recording control circuit 54 and input to the video recording apparatus 62 from the recording output terminal 59.

The video recording apparatus 62 outputs (performs through output of) a signal input to the input terminal while it is not generating a video signal. When a video signal (actually noise component only) is input to the input terminal from the video switching apparatus 51 while generation by the video recording apparatus 62 is halted, the input video signal is output from the output terminal then input to the generation input terminal 58 of the video switching apparatus 51. That is, when generation operation is halted in the video recording apparatus 62 while the video switching apparatus 51 is operating in Mode B, a so-called signal path loop is formed thus causing failure such as oscillation.

SUMMARY OF THE INVENTION

The invention has been proposed in view of the aforementioned circumstances and aims at providing video switching apparatus that can generate a multiple video signal where an ID signal conforming to a system different from that employed by the apparatus in use is superimposed, and that can prevent failure such as oscillation in the generation mode according to the different system.

In order to solve such a problem, the first aspect of the invention is video switching apparatus for performing switchover to generate a video switching apparatus multiplexed on a plurality of channels, comprising ID detection means for detecting an ID signal for a channel-identification superimposed on said video signal, said ID signal including at least any one of a unique ID signal which conforms to the video switching apparatus or a non-unique ID signal which does not conform to the video switching apparatus; ID signal generation means for generating said unique ID signal; state determination means for determining an operating state based on a detection result obtained by said ID detection means and a specific operation mode; ID selection means for selecting the unique ID signal generated by said ID signal generation means based on a determination result by said state determination means, wherein said determination result is such that the specific operating mode is to generate the video signal where said non-unique ID signal is superimposed thereon when an ID signal is detected in a video signal by said ID detection means, and video signal switching control means for switching over said video signal based on ID information in the ID signal selected by said ID selection means. The second aspect of the invention is video switching apparatus characterized in that the ID detection means preferably detects presence/absence of a unique or non-unique ID signals superimposed ID signal in the vertical blanking period of the video signal.

The third aspect of the invention is video switching apparatus characterized in that the video signal switching control means preferably outputs a black image or a blue image in case an ID signal is not detected in the video signal.

The fourth aspect of the invention is video switching apparatus for performing switchover to generate a video switching apparatus multiplexed on a plurality of channels, characterized in that the apparatus comprises video halt detection means for detecting halt or continuation of the video signal, ID signal generation means for generating a unique ID signal conforming to the apparatus, state determination means for determining the operating state via the detection result by the video halt detection means and the specified operation mode, ID selection means for selecting the conforming ID signal generated by the ID signal generation means based on the determination result by the state determination means in a mode for generating a video signal where a non-unique ID signal is superimposed and only in case it is detected that a video signal is continued by the video halt detection means, and video signal switching control means for switching over the image signal via ID information in the ID signal selected by the ID selection means.

The fifth aspect of the invention is video switching apparatus characterized in that the video halt detection means preferably detects halt or continuation of the video signal via the state of an ID signal or a synchronization signal.

The sixth aspect of the invention is video switching apparatus characterized in that the video signal switching control means preferably outputs a black image or a blue image in case it has detected halt of the video signal.

In the aforementioned configuration, presence/absence of an ID signal is detected halt/continuation of a video signal is detected via a synchronization signal for the video signal. Then, a conforming ID signal is appended to switch over a video signal in a mode for generating a video signal where a nonconforming ID signal is superimposed and only in case an ID signal is detected in a video signal. Via this configuration, it is possible to generate as required a predetermined channel for a multiple video signal where a nonconforming ID signal is superimposed.

In a mode for generating a video signal where a nonconforming ID signal is superimposed and in case an ID signal cannot be detected or halt state of a video signal is detected, operation is controlled not to append a conforming ID signal and to switch over a video signal. Via this configuration, a black image or a blue image is output from video recording apparatus in case video generation by video recording apparatus for generating a video signal is halted and an input signal is output through the output terminal. Thus a signal path loop is not formed across video switching apparatus and video recording apparatus thereby preventing abnormal operation such as oscillation.

DESCRIPTION OF THE PREFERRED EMBODIMENTS

Figure 1:
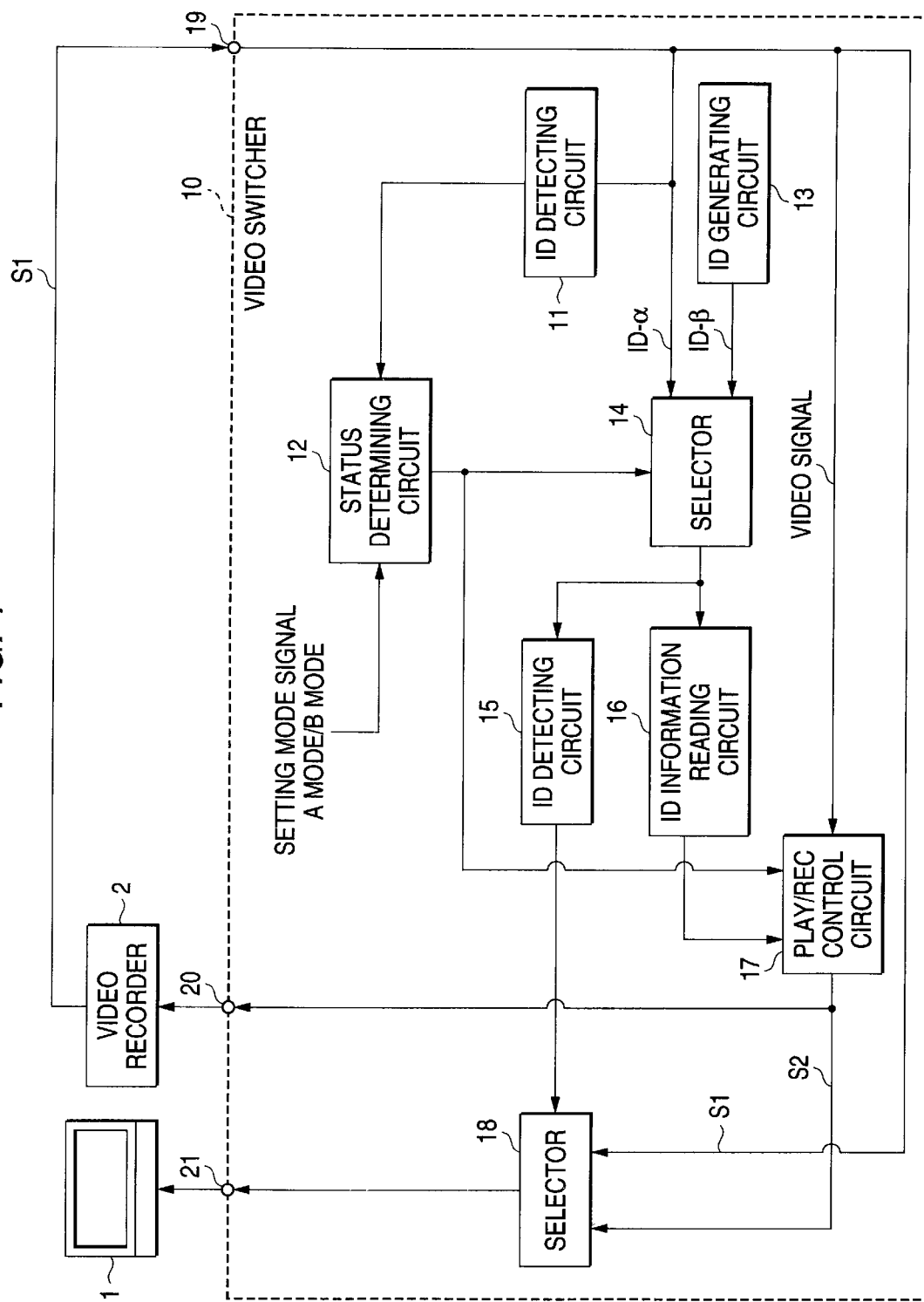
FIG. 1 shows a block diagram showing the configuration of video switching apparatus according to the first embodiment of the invention.

Embodiments of the invention will be described referring to the drawings.

Figure 2:
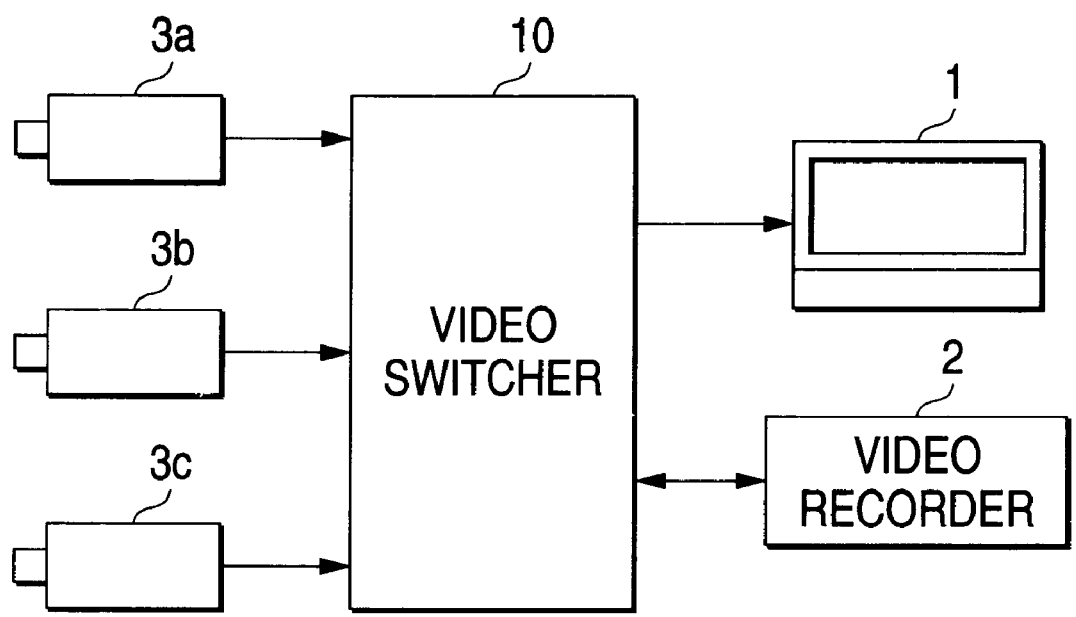
FIG. 2 shows a block diagram showing the configuration of video monitoring apparatus using the video switching apparatus.

FIG. 1 is a block diagram showing the configuration of video switching apparatus or video switcher according to the first embodiment of the invention. FIG. 2 is a block diagram showing the configuration of video monitoring apparatus using the video switcher.

The video switcher 10 inputs a plurality of video signals and divides and multiplexes the video signals on channels in time units such as frames or fields and inputs the multiplexed video signal and select a channel to outputs the video signal on a predetermined channel. The video switcher 10 is used for example in video monitoring apparatus for monitoring video pictures shot by a plurality of cameras.

As shown in FIG. 2, in the video monitoring apparatus, video outputs of video cameras 3*a*, 3*b*, 3*c* installed in a plurality of locations are connected to the video switcher 10. To the video switcher 10, a monitor 1 for displaying video pictures and video recording apparatus or video recorder 2 such as a VTR for recording/generating a video signal.

A plurality of video signals shot and output by the video cameras 3a, 3b, 3c are output as a single video signal that is time-division multiplexed with a video signal of each series being a video signal on a separate channel and where a plurality of channels are sequentially selected per frame or per field. In order for a video signal on each channel to be identified in generation, an ID signal for channel identification is superimposed in the vertical blanking period of the video signal. The multiple video signal is output to the video recorder 2 and recorded therein. From the video switcher 10 a video signal on a predetermined channel is output to and displayed on the monitor 1.

As shown in FIG. 1, the video switcher 10 comprises an ID detecting circuit 11 for detecting presence/absence of an Id signal in the input video signal, a state determination circuit 12 for determining whether to add a conforming ID signal depending on the specified operation mode and the state of the ID signal, an ID generation circuit 13 for generating a conforming ID signal, and a selector 14 for selecting an ID signal based on the output of the state determination circuit 12. The video switcher 10 also comprises an ID detecting circuit 15 for detecting presence/absence of a conforming ID signal, an ID information read circuit 16 for reading the information in the ID signal and outputting the ID information, a play/recording control circuit 17 for processing a video signal based on the input ID information, and a selector 18 for selecting an ID signal based on the output of the ID detecting circuit 15. To a generation input terminal 19 is connected the output terminal of the video recorder 2. To a recording output terminal 20 is connected the input terminal of the video recorder 2. To a monitor output terminal 21 is connected the monitor 1.

The video switcher 10 is configured so that the generation mode may be set in advance on the menu setup section (not shown) by the user to input a setup mode signal. The case where a multiple video signal on which an ID signal conforming to the same system as the apparatus in use is superimposed is generated is called Mode A, while the case where a multiple video signal on which an ID signal of a different system is superimposed is generated is called Mode B.

The ID detecting circuit 11 corresponding to ID detection means according to one aspect of the invention detects presence/absence of an ID signal in the vertical blanking period in a video signal input from the generation input terminal 19. The ID detecting circuit 11 then outputs the detection result to the state determination circuit 12. The ID detecting circuit 11 detects an ID signal, conforming or nonconforming, in the vertical blanking period. For example, the ID detecting circuit 11 monitors the level of a video signal for several a multiple of H (H being a single horizontal period) and determines presence/absence of an ID signal based on whether the low-level state persists. Via this configuration, it is possible to determine the state where an ID signal is superimposed on an input video signal from the video recorder 2 as well as the state where an ID signal is not superimposed on the input video signal or where generation by the video recorder 2 is not operational.

The state determination circuit 12 corresponding one aspect of the invention is composed by an AND (logical product) circuit. The state determination circuit 12 outputs a switching control signal to the selector 14 that corresponds to ID selection means, based on a setup mode signal (Mode A or Mode B) input from a control circuit depending on the operation mode set on the menu setup section (not shown) by the user and the ID detection result from the ID detecting circuit 11. The setup mode signal goes LOW for Mode A and goes HIGH for Mode B. Output of the ID detecting circuit 11 goes HIGH when "ID is detected" and goes LOW when "ID is not detected."

In this embodiment, an ID signal (id-$\beta$: conforming ID signal) generated by the ID generation circuit 13 corresponding to ID signal generation means is selected by the selector 14 and used as an ID signal appended to the video signal in Mode B for generating a multiple video signal where a nonconforming ID signal is superimposed and in case an ID signal (nonconforming ID signal in this case) superimposed on the video signal is detected (a switching control signal from the state determination circuit 12 is HIGH). Otherwise, that is, in Mode A for generating a multiple video signal where an ID signal conforming to the same system as the apparatus in use is superimposed or in case an ID signal is not detected in the vertical blanking period (a switching control signal from the state determination circuit 12 is LOW) in Mode B, a video signal is input from the generation input terminal 19 is selected and an ID signal (ID-$\alpha$) superimposed on the video signal in advance is used.

It is possible to configure the ID detecting circuit 11, the state determination circuit 12, and the ID generation circuit 13 on a same semiconductor device such as an FPGA. Thus, for FPGA, it is possible to add configuration of the ID detecting circuit 11 and the state determination circuit 12 by slightly modifying the circuit configuration program.

The ID detecting circuit 15 detects whether an ID signal is superimposed on a video signal and outputs a switching control signal to the selector 18 depending of the detection result of presence/absence of the ID signal. The ID detecting circuit 15 detects only a conforming ID signal superimposed in the vertical blanking period. The ID detecting circuit 15 can serve as the ID detecting circuit 11 as well. The selector 18 outputs an output video signal S2 of the play/recording control circuit 17 to the monitor output terminal 21. The output video signal S2 of the play/recording control circuit 17 is also supplied to the recording output terminal 20.

The ID information read circuit 16 reads the information in the ID signal and outputs the ID information to the play/recording control circuit 17. The play/recording control circuit 17 corresponding to video signal switching control means according to one aspect of the invention processes the video signal based on the input ID information. For example, the play/recording control circuit 17 extracts and outputs only a video signal where the predetermined same ID information specified by the user is superimposed from a multiple video signal divided on channels per frame or field. In case no ID information is input, the play/recording control circuit 17 outputs a black image or blue image video signal.

Video switcher 10 according to this embodiment uses four operation modes in generation of a multiple video signal:
(1) ID Signal is Detected in Mode A In this operation, Mode A is set by the user and an ID signal is detected by the ID detecting circuit 11 in the vertical blanking period of a video signal input from the generation input terminal 19. This operation corresponds to a case where the video recorder 2 generates a multiple video signal where a conforming ID signal is superimposed and inputs the multiple video signal to the video switcher 10 and selectively extracts a predetermined channel of the video signal for generation and display based on ID information. In this case, a low level switching control signal is output from the state determination circuit 12 and a signal at the generation input terminal 19 or an original ID signal ID-$\alpha$ in an input video signal is selected by the selector 14.

(2) ID Signal is not Detected in Mode A

In this operation, Mode A is set by the user and an ID signal is not detected by the ID detecting circuit 11 in the vertical blanking period of a video signal input from the generation input terminal 19. This operation corresponds to a case where an ID signal is not superimposed on a video switcher generated by the video recorder 2 and input to the video switcher 10 or generation by the video recorder is not operational (video signal is in non-signal state). In this case also, a low level switching control signal is output from the state determination circuit 12 and the original ID signal ID α in a signal at the generation input terminal 19 or input video signal is selected by the selector 14.

(3) ID Signal is Detected in Mode B

In this operation, Mode B is set by the user and an ID signal is detected by the ID detecting circuit 11 in the vertical blanking period of a video signal input from the generation input terminal 19. This operation corresponds to a case where the video recorder 2 generates a multiple video signal where a nonconforming ID signal is superimposed and inputs the multiple video signal to the video switcher 10 and selectively extracts a predetermined channel of the video signal for generation and display based on ID information. In this case, a high level switching control signal is output from the state determination circuit 12 and a signal at the ID generation circuit 13 or a generated conforming ID signal ID-β is selected by the selector 14.

(4) ID Signal is not Detected in Mode B

In this operation, Mode B is set by the user and an ID signal is not detected by the ID detecting circuit 11 in the vertical blanking period of a video signal input from the generation input terminal 19. This operation corresponds to a case where an ID signal is not superimposed on a video switcher generated by the video recorder 2 and input to the video switcher 10 or generation by the video recorder is not operational (video signal is in non-signal state). In this case also, a low level switching control signal is output from the state determination circuit 12 and the original ID signal ID-α in a signal at the generation input terminal 19 or input video signal is selected by the selector 14.

Next, generation operation by video switcher 10 according to this embodiment will be detailed.

A video signal generated by the video recorder 2 is input to the video switcher 10. Switching control is made depending on the setup mode and presence/absence of an ID signal, then a video signal is output to the monitor 1 and/or video recorder 2.

For Mode A, that is, in the aforementioned cases (1) and (2), a switching control signal from the state determination circuit 12 is LOW, so that the input of the selector 14 is connected to the generation terminal 19. A video signal (including the original ID signal ID-α) is input to the ID detecting circuit 15 and the ID information read circuit 16. In case an Id signal superimposed on a video signal is detected by the ID detecting circuit 15 (corresponding to the state (1)), an output video signal S2 of the play/recording control circuit 17 is output from the monitor output terminal 21 via the selector 18, them sent to the monitor 1. Information in the ID signal is read by the ID information read circuit 16 and the information is output to the play/recording control circuit 17 as ID information. In the play/recording control circuit 17, only a signal on a channel where the predetermined same ID information specified by the user is superimposed is output from a multiple video signal divided on channels for example per frame or field. The output video signal S2 of the play/recording control circuit 17 is output to the recording output terminal 20 then sent to the video recorder 2.

On the other hand, in case ID information is not obtained by the ID information read circuit 16 (corresponding to the state (2)), a video signal S1 input to the generation input terminal 19 is output from the monitor output terminal 21 via the selector 18. At the same time, a black image or blue image video signal is output from the play/recording control circuit 17 and the video signal is sent from the recording output terminal 20 to the video recorder 2. In case an ID signal is not superimposed a video signal or generation by the video recorder 2 is not operational, a black image or blue image video signal is output from the play/recording control circuit 17 to the video recorder 2. Thus, a signal path loop is not formed across the video recorder 2 and the video switcher 10 even in case the video recorder 2 is placed in the halt state, causing an input signal to the input terminal to be output through the output terminal.

In case an ID signal is detected in Mode B, that is, in the aforementioned case (3), a switching control signal from the state determination circuit 12 is HIGH, so that the input of the selector 14 is connected to the ID generation circuit 13. A conforming ID signal generated by the ID generation circuit 13 is input to the ID detecting circuit 15 and the ID information read circuit 16 via the selector 14. In this case, an ID signal ID-β from the ID generation circuit 13 is detected by the ID detecting circuit 15. An output video signal S2 of the play/recording control circuit 17 is output from the monitor output terminal 21 via the selector 18, them sent to the monitor 1. From the play/recording control circuit 17, only a signal on a channel where the predetermined same ID information for example specified by the user is superimposed is extracted based on ID information read by the ID information read circuit 16 and the video signal is output to the selector 18. In this way, it is possible to make switching control of a multiple video signal where an ID signal conforming to a different system from the specifications of the apparatus by generating an ID signal conforming to the system of the apparatus and associating the signal with the video signal, thereby allowing generation of a predetermined channel.

In case an ID signal is not detected in Mode B, that is, in the aforementioned case (4), a switching control signal from the state determination circuit 12 is LOW, so that the input of the selector 14 is connected to the generation input terminal 19. A video signal input from the generation input terminal 19 is input to the ID detecting circuit 15 and the ID information read circuit 16 via the selector 14. In this case, an ID signal is not detected by the ID detecting circuit so that a video signal S1 input to the generation input terminal 19 is output from the monitor output terminal 21 via the selector 18. At the same time, a black image or blue image video signal is output from the play/recording control circuit 17 and the video signal is sent from the recording output terminal 20 to the video recorder 2. Thus, a signal path loop is not formed across the video recorder 2 and the video switcher 10 even in case the video recorder 2 is placed in the halt state, causing an input signal to the input terminal to be output through the output terminal.

As mentioned earlier, according to this embodiment, it is detected whether an ID signal is present in the vertical blanking period of a video signal in appending a conforming ID signal in the video switcher 10 in order to generate a multiple video signal where a nonconforming ID signal is superimposed, and the ID signal generated by the ID generation circuit 13 is used to process the multiple video signal only in case a nonconforming ID signal is superimposed. As a result, such an operation as forcibly appending a conforming ID signal to switch a video signal is prevented in case where Mode B for generating a multiple video signal where a nonconforming ID signal is superimposed is selected even when an ID signal is not superimposed or in case the video recorder 2 has halted generation operation. In case an input signal is output through an output terminal, for example, the video recorder 2 has halted generation operation, a signal path loop is not formed this suppressing failure such as oscillation.

Figure 3:
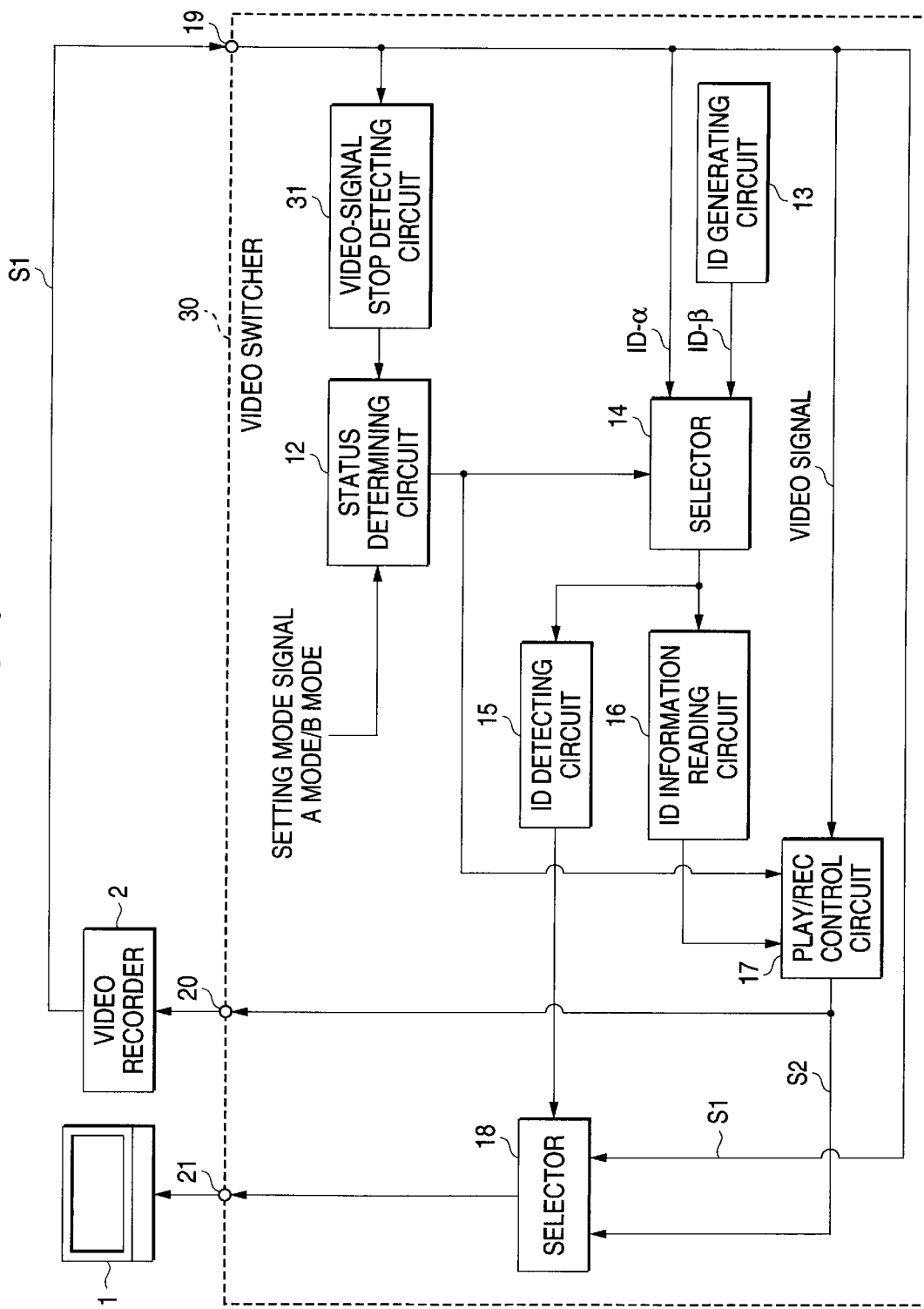
FIG. 3 shows a block diagram showing the configuration of video switching apparatus according to the second embodiment of the invention.
Figure 4:
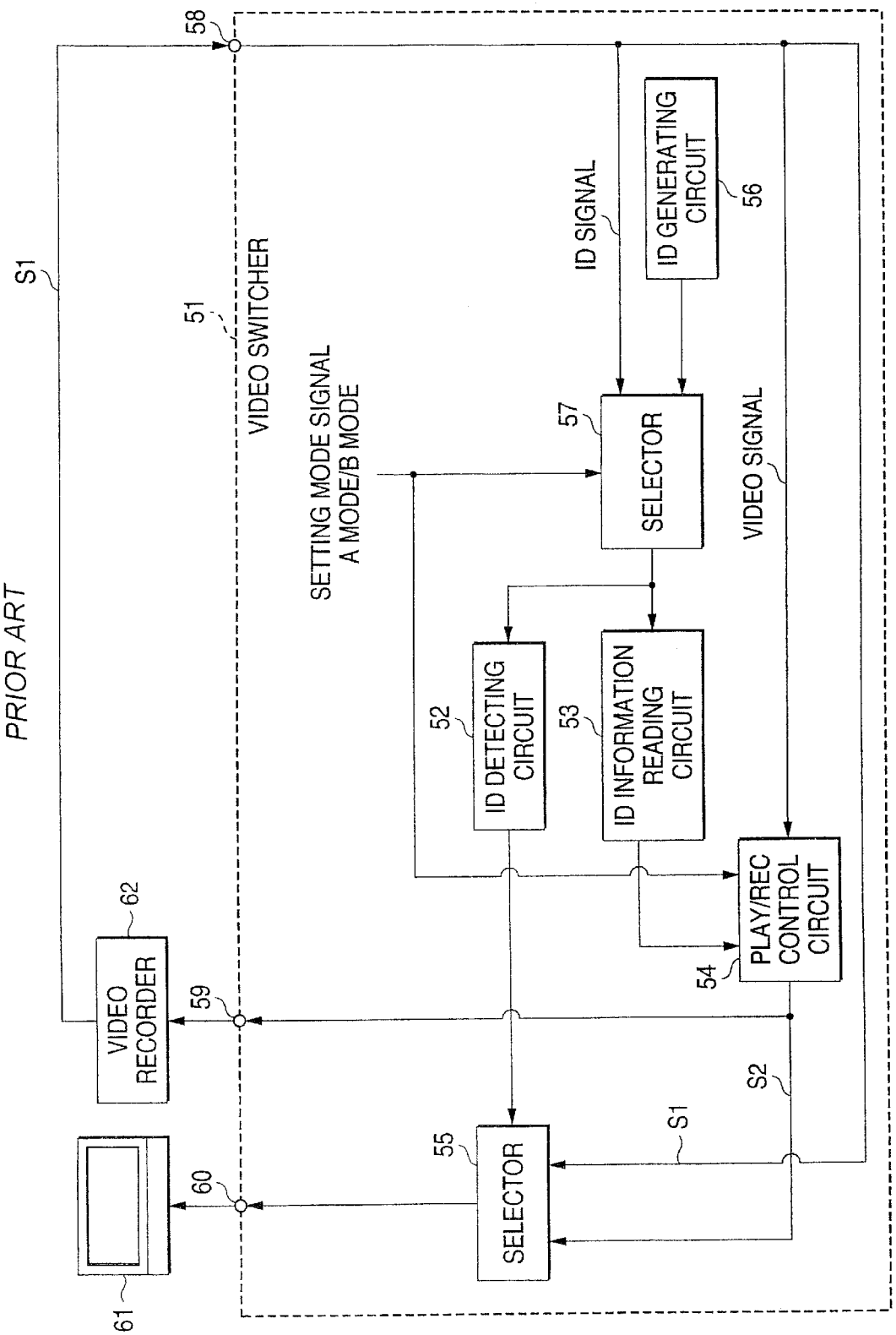
FIG. 4 shows a block diagram showing the configuration of related art video switching apparatus.

FIG. 3 is a block diagram showing the configuration of video switcher according to the second embodiment of the invention. When an ID signal is appended to perform switching control in case video recorder connected to video switcher has halted generation operation causing through output between the input and output terminals may cause a signal path loop resulting in oscillation. The second embodiment shows an exemplary configuration where video halt detection means for detecting halt state of a video signal is provided and a conforming ID signal is not appended when halt of the video signal is detected in Mode B.

Video switcher 30 according to the second embodiment comprises a video signal halt detecting circuit 31 corresponding to video halt detection means instead of the ID detecting circuit 11 in the first embodiment. The video signal halt detecting circuit 31 detects for example a synchronization signal of a video signal and determines whether a video signal is actually input from the jitter component in order to detect the halt state of a video signal. The output of the video signal halt detecting circuit 31 goes HIGH when the video signal is continuous while it goes LOW when halt of the video signal is detected. The corresponding detection result is input to the state determination circuit 12. The remaining configuration and operation are the same as those of the first embodiment and the corresponding description will be omitted.

Thus, in the second embodiment, an ID signal generated by the ID generation circuit 13 is not appended and switching control of a video signal is skipped while input of a video signal from the video recorder 2 is halted even in case the halt state of a video signal is detected and Mode B is specified. A multiple video signal is processed using an ID signal generated by the ID generation circuit 13 only in case Mode B is specified and input of a video signal is continuous. Via this configuration, it is possible to prevent formation of a signal path loop thus avoiding an abnormal operation such as oscillation. It is also possible to grasp the state of the apparatus in a more appropriate way.

Advantages of the Invention

As mentioned earlier, according to the invention, it is possible to provide video switcher that can generate a multiple video signal where an ID signal conforming to a system different from that employed by the apparatus in use is superimposed, and that can prevent failure such as oscillation in the generation mode according to the different system.

What is claimed is:

1. Video switching apparatus for performing switchover to generate a video signal multiplexed on a plurality of channels, comprising:

ID detection means for detecting an ID signal for a channel-identification superimposed on said video signal, said ID signal including at least any one of a unique ID signal which conforms to the video switching apparatus or a non-unique ID signal which does not conform to the video switching apparatus;

ID signal generation means for generating said unique ID signal;

state determination means for determining an operating state based on a detection result obtained by said ID detection means and a specific operation mode;

ID selection means for selecting the unique ID signal generated by said ID signal generation means based on a determination result by said state determination means, wherein said determination result is such that the specific operating mode is to generate the video signal where said non-unique ID signal is superimposed thereon when an ID signal is detected in a video signal by said ID detection means, and video signal switching control means for switching over said video signal based on ID information in the ID signal selected by said ID selection means.

2. Video switching apparatus according to claim 1, wherein said ID detection means detects presence/absence of a unique or non-unique ID signal superimposed in a vertical blanking period of said video signal.

3. Video switching apparatus according to claim 1, wherein said video signal switching control means outputs at least any one of a black-color video signal and a blue-color video signal in a state where said ID signal is not detected in said video signal.

4. Video switching apparatus for performing switchover to generate a video switching apparatus multiplexed on a plurality of channels, comprising:

video halt detection means for detecting halt-signal or continuation-signal or said video signal;

ID signal generation means for generating an a unique ID signal which conforms to the video switching apparatus;

state determination means for determining an operating state based on a detection result obtained by said video halt detection means and a specific operation mode;

ID selection means for selecting the unique ID signal generated by said ID signal generation means based on a determination result by said state determination means, wherein said determination result is such that the specific operating mode is to generate the video signal where a non-unique ID signal, which does not conform to the video switching apparatus, is superimposed thereon when a continuation-signal is detected in a video signal by said video halt detection means, and video signal switching control means for switching over said video signal based on ID information in an ID signal selected by said ID selection means, said ID signal having a state including at least any one of the unique ID signal and the non-unique ID signal.

5. Video switching apparatus according to claim 4, wherein said video halt detection means detects the halt-signal or the continuation-signal of said video signal in accordance with the state of the TD signal or a synchronization signal of the video signal.

6. Video switching apparatus according to claim 4, wherein said video signal switching control means outputs at least any one of a black-color video signal and a blue-color video signal in a state where the halt-signal is detected.

* * * * *

UNITED STATES PATENT AND TRADEMARK OFFICE
CERTIFICATE OF CORRECTION

PATENT NO. : 6,744,475 B2
DATED : June 1, 2004
INVENTOR(S) : Kazuo Nozaki et al.

It is certified that error appears in the above-identified patent and that said Letters Patent is hereby corrected as shown below:

Column 10,
Line 59, please delete "TD" and insert therefor -- ID --.

Signed and Sealed this

Tenth Day of August, 2004

JON W. DUDAS
*Acting Director of the United States Patent and Trademark Office*